(12) United States Patent
Szabolcs

(10) Patent No.: US 11,819,771 B2
(45) Date of Patent: Nov. 21, 2023

(54) COLLAPSIBLE HANGING CHAIR AND VIRTUAL REALITY SIMULATOR COMPRISING SUCH HANGING CHAIR

(71) Applicant: János Szabolcs, Budapest (HU)

(72) Inventor: János Szabolcs, Budapest (HU)

( * ) Notice: Subject to any disclaimer, the term of this patent is extended or adjusted under 35 U.S.C. 154(b) by 365 days.

(21) Appl. No.: 17/295,841

(22) PCT Filed: Nov. 20, 2019

(86) PCT No.: PCT/HU2019/050052
§ 371 (c)(1),
(2) Date: May 20, 2021

(87) PCT Pub. No.: WO2020/104825
PCT Pub. Date: May 28, 2020

(65) Prior Publication Data
US 2022/0008834 A1    Jan. 13, 2022

(30) Foreign Application Priority Data
Nov. 22, 2018   (HU) .................................. P1800395

(51) Int. Cl.
*A45F 3/26* (2006.01)
*A63G 31/16* (2006.01)
(Continued)

(52) U.S. Cl.
CPC ................ *A63G 31/16* (2013.01); *A45F 3/26* (2013.01); *A47C 3/0255* (2013.01); *A47C 4/045* (2013.01); *A47C 4/18* (2013.01); *G06T 19/006* (2013.01)

(58) Field of Classification Search
CPC .... A63G 9/00; A63G 9/12; A45F 3/26; A47C 3/0252; A47C 3/0255; A47C 4/045; A47C 4/18
(Continued)

(56) References Cited

U.S. PATENT DOCUMENTS 4,825,855 A * 5/1989 Kundson, Jr. ............. A61F 6/02
600/38
5,851,053 A   12/1998 Crawford
(Continued)

FOREIGN PATENT DOCUMENTS

CN       204635626 U    9/2015
CN       106419222 A    2/2017
(Continued)

*Primary Examiner* — Kien T Nguyen
(74) *Attorney, Agent, or Firm* — Olson & Cepuritis, Ltd.

(57) ABSTRACT

The invention relates to a hanging chair that contains a frame (2), suspension (50) that may be secured to the frame (2) and a first canvas (70) determining a seat (72) supported by the frame (2), characterised by that the frame (2) contains three ring-shaped frame elements (10, 20, 30), of which—a first and second frame element (10, 20) are secured to each other along a first axis (125) with a first pair of fasteners (123, 124), —the second and a third frame element (20, 30) are secured to each other along a second axis (235) on a side of the second frame element (20) opposite the first axis (125) with a second pair of fasteners (233, 234), and—the first and third frame elements (10, 30) are secured to each other along a third axis (135) on a side of the first frame element (10) opposite the first axis (125) with a third pair of fasteners (133, 134), and with the frame elements (10, 20, 30) secured to each other and in suspended state, the suspension (50) is located outside of the frame (2), above the first frame element (10), while the second pair of fasteners (233, 234) securing the second and third frame elements (20, 30) to each other are located below the first frame element (10), the seat (72) of the first canvas (70) is located outside of the frame (2), outwards from the second frame element (20), and the third frame element (30) delimits a seat opening (33) permitting access to the seat (72). The invention also relates to a virtual reality simulator that contains such a hanging chair.

16 Claims, 16 Drawing Sheets

Figure 1:
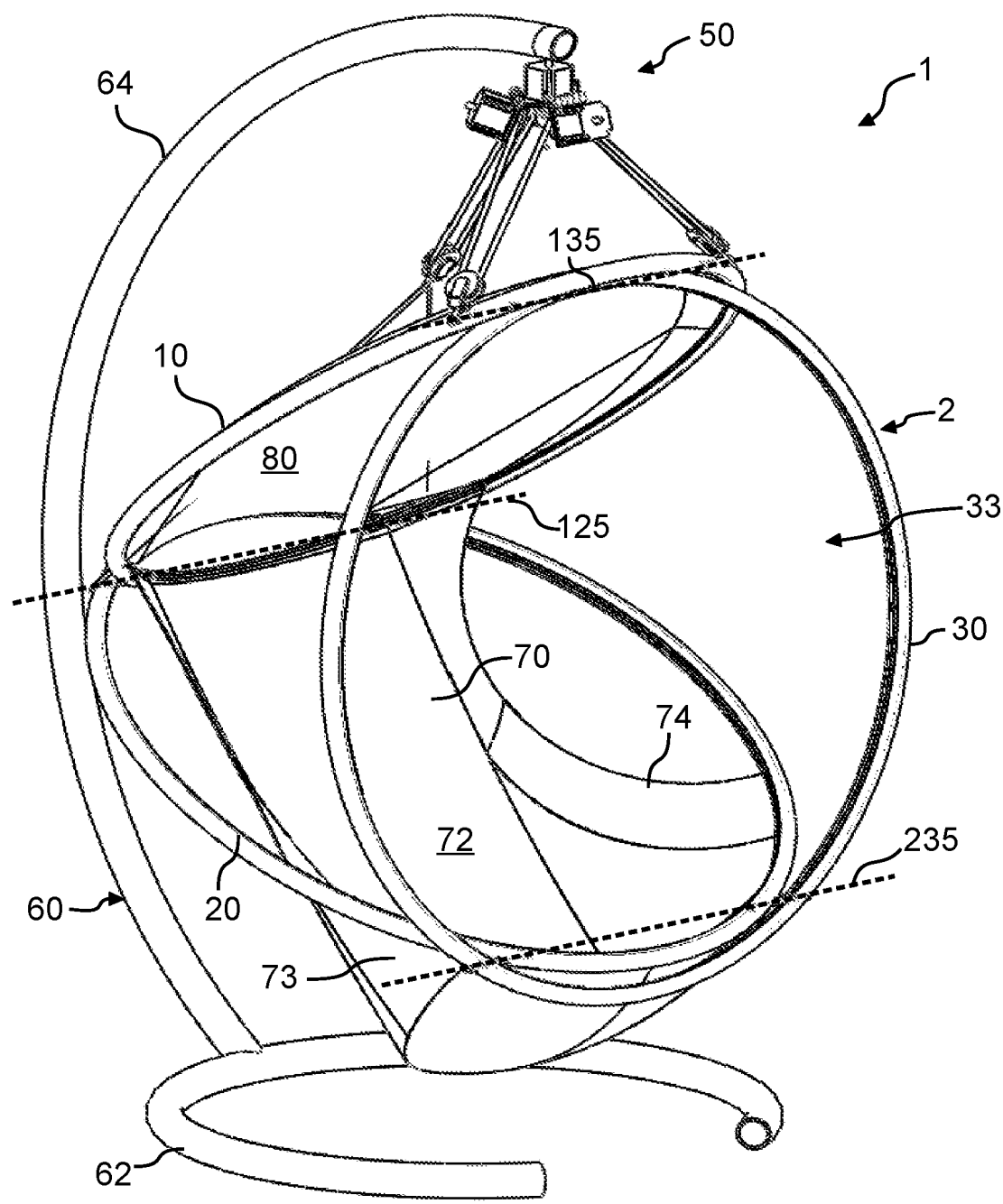

(51) Int. Cl.
　　　*A47C 3/025*　　(2006.01)
　　　*A47C 4/04*　　　(2006.01)
　　　*A47C 4/18*　　　(2006.01)
　　　*G06T 19/00*　　(2011.01)
　　　*A63G 9/00*　　　(2006.01)

(58) Field of Classification Search
　　　USPC ............ 472/118–125; 297/273, 277, 42, 45; 5/120
　　　See application file for complete search history.

(56) References Cited

U.S. PATENT DOCUMENTS

| 10,631,647 | B1 * | 4/2020 | Wu ............................ A45F 3/24 |
| 10,912,386 | B2 * | 2/2021 | Xuemin ................ A47C 3/0252 |
| 2008/0203774 | A1 * | 8/2008 | Hemetsberger ........ A47C 7/666 297/16.2 |
| 2018/0310697 | A1 | 11/2018 | Wehner |

FOREIGN PATENT DOCUMENTS

| DE | 8131985 U1 | 5/1982 |
| DE | 9307813 U1 | 7/1993 |

\* cited by examiner

COLLAPSIBLE HANGING CHAIR AND VIRTUAL REALITY SIMULATOR COMPRISING SUCH HANGING CHAIR

CROSS-REFERENCE TO RELATED APPLICATIONS

This application is a U.S. National Stage of PCT/HU2019/050052, filed on 20 Nov. 2019, and claiming priority to Hungarian Application No. P1800395 filed on 22 Nov. 2018, both of which are incorporated herein by reference.

The invention relates to a collapsible hanging chair, which contains a frame, suspension that may be secured to the frame and a first canvas supported by the frame and containing a seat.

Hanging chairs have always been popular, however the hanging chairs according to the state of the art do not simultaneously satisfy the requirement of comfort, ergonomics, safety, ease of transportation and storage. The egg-shaped or hemispherical rigid, typically wicker walled hanging chairs which are fashionable today, the user's spine necessarily conforms to the shape of the rigid wall when sitting in the chair, which does not necessarily correspond to the individual's anatomy. In addition, due to the rigid wall it is difficult to transport these chairs, and their storage takes up a lot of space. Although the stiffening elements of a basket-like hanging chair according to US 2018/0310697 A1 may be folded in a direction parallel to each other, such that when it is folded up it takes up less space, however, from an ergonomic point of view the stiffening elements are overall just as disadvantageous as the completely rigid wicker wall. Although hanging chairs without stiffening can fit into a small space, however, when using such hanging chairs the user takes on an unhealthy, hunched up position. Intermediate solutions include, for example, the hanging chair disclosed in U.S. Pat. No. 5,851,053, which provides a certain amount of support for the canvas serving as the seat with a number of rigid rods. However, this type of hanging chair is still not sufficiently ergonomic, in addition the stiffening elements and the suspension strings make sitting into the chair difficult.

The objective of the invention is to provide a hanging chair that is free of the disadvantages of the solutions according to the state of the art. The objective is particularly to provide a hanging chair that is ergonomic and comfortable even when used for many hours, easy to sit into and get out of, and that may be folded up in a space-saving way for example for the purpose of transportation and storage.

The objective of the invention is also to provide a virtual reality simulator, the chair of which easily moves in response to the user's movement which is ergonomic, comfortable even when used for many hours, which is easy to sit into and get out of, and which may be folded up in a space-saving way for example for the purpose of transportation and storage.

The invention is based on the recognition that three ring-shaped frame elements connected by releasable connections and pivoting connections can be used to create a collapsible frame having, when in an assembled state, a first frame element determining the top of the hanging chair, a second frame element provided with a seat, and a third frame element serving for stiffening the chair and for delimiting a seat opening for easily accessing the seat.

It was also recognised that such a hanging chair may advantageously be used as the chair of a virtual reality simulator.

On the basis of the above recognition the task was solved with a hanging chair according to claim 1.

Preferred embodiments of the invention are defined in the dependent claims.

Figure 1A:
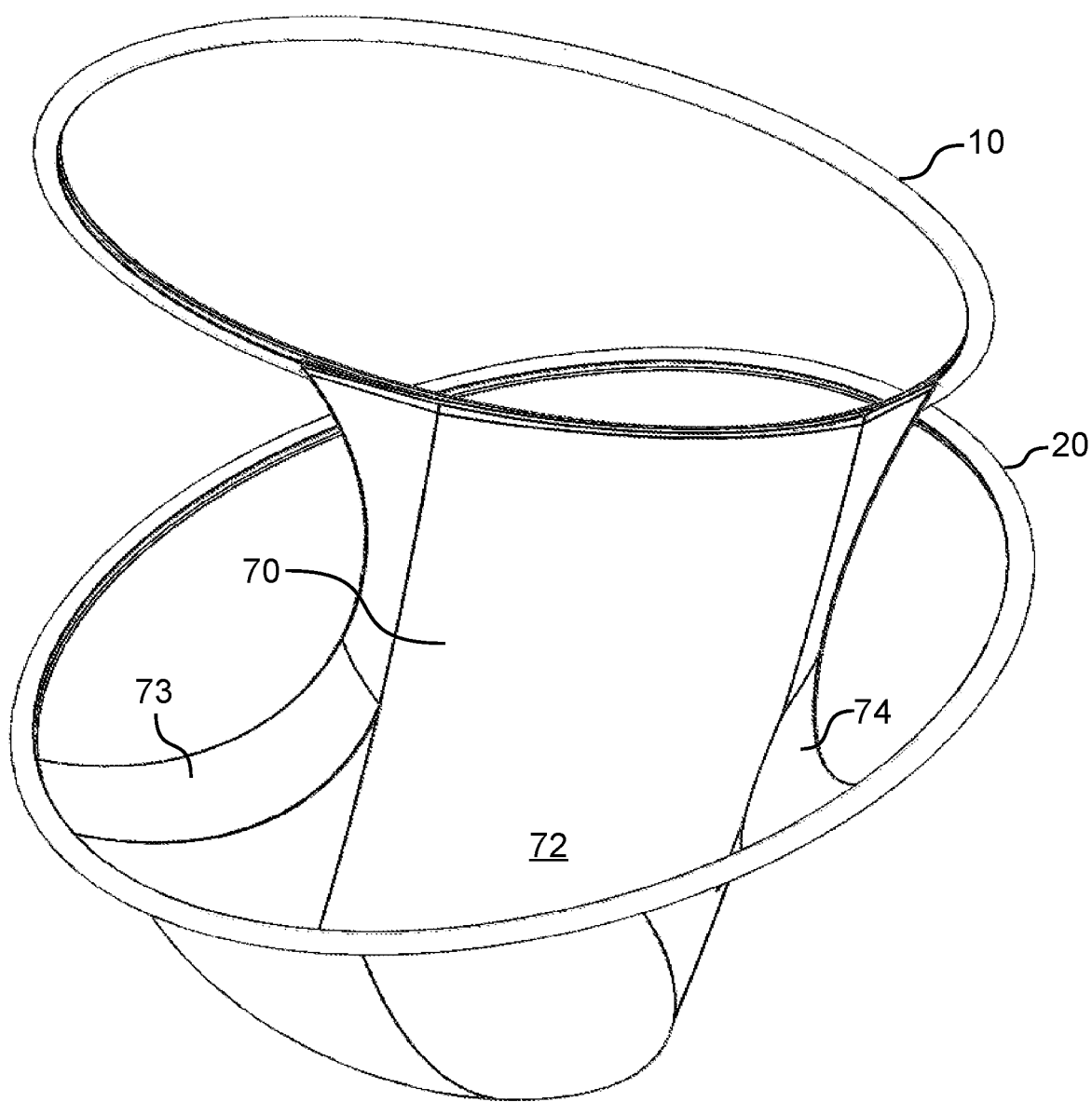
Figure 1B:
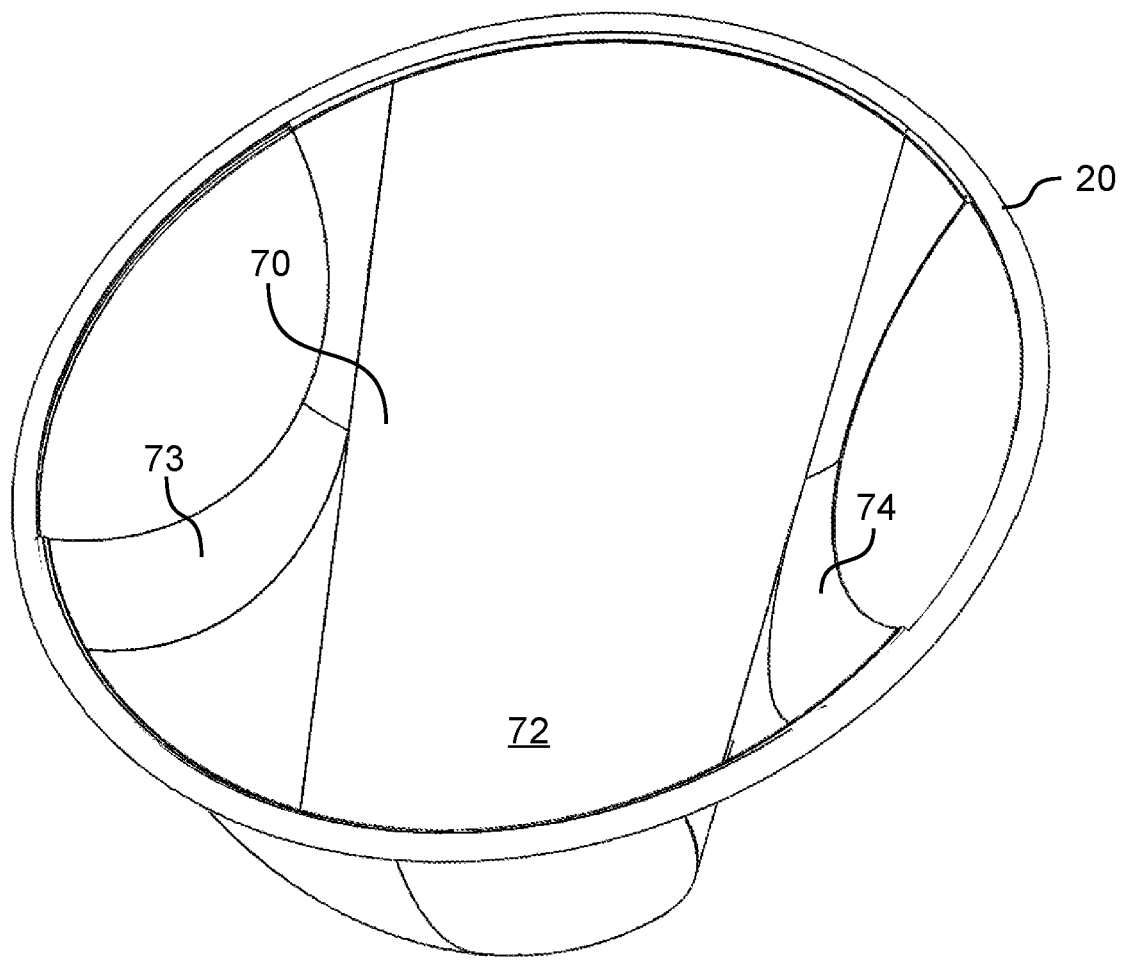
Figure 2:
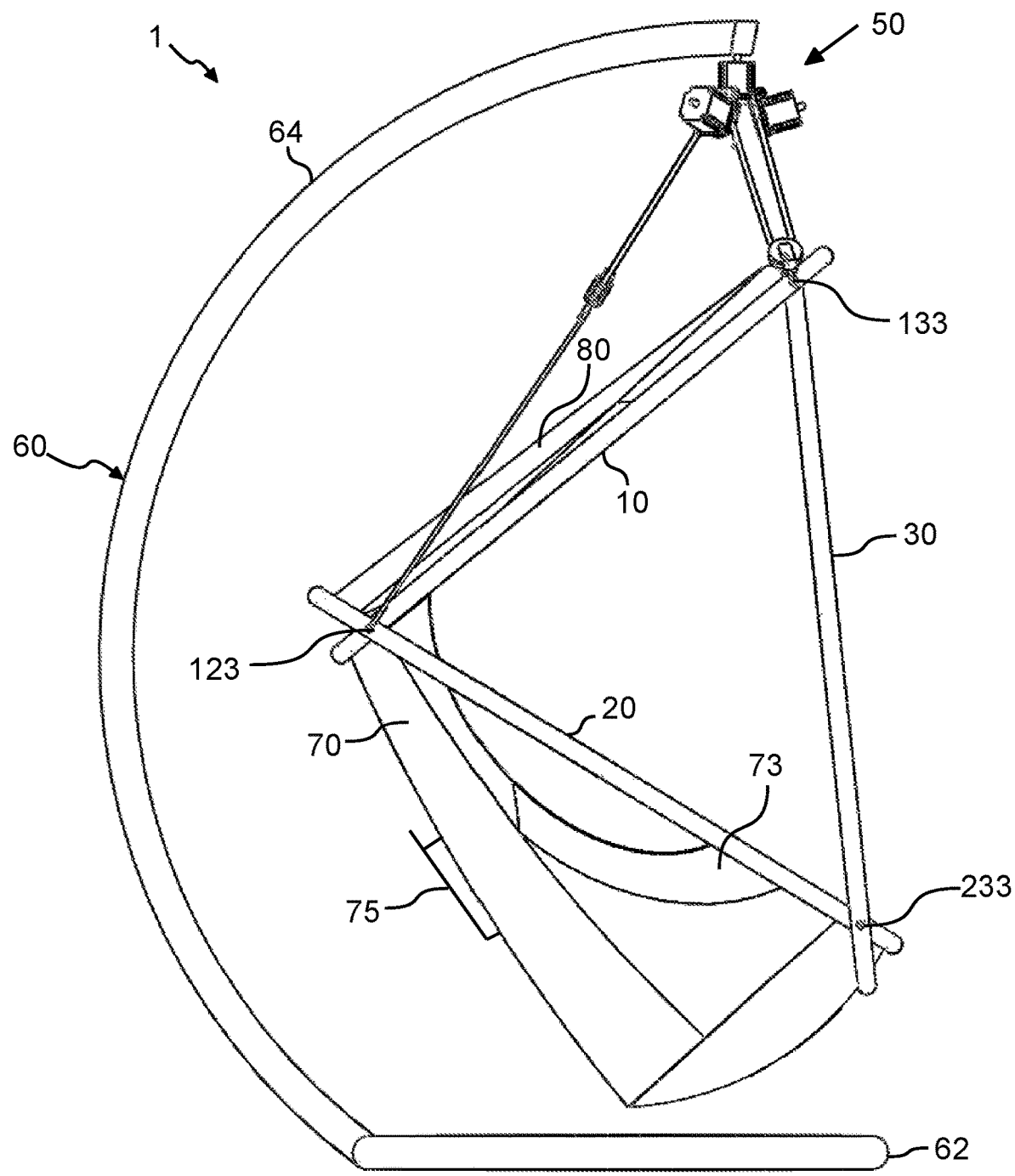
Figure 3:
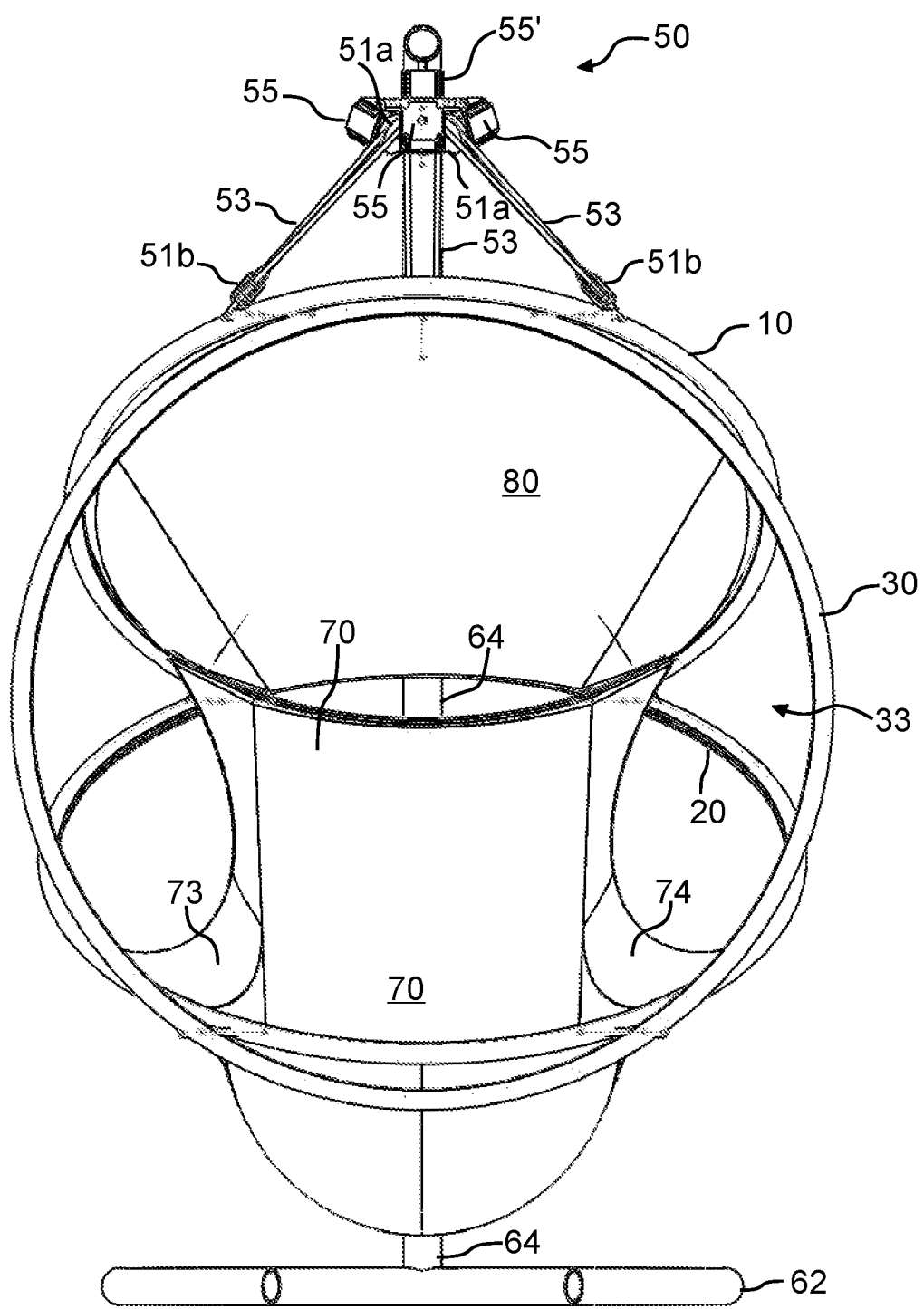
Figure 4:
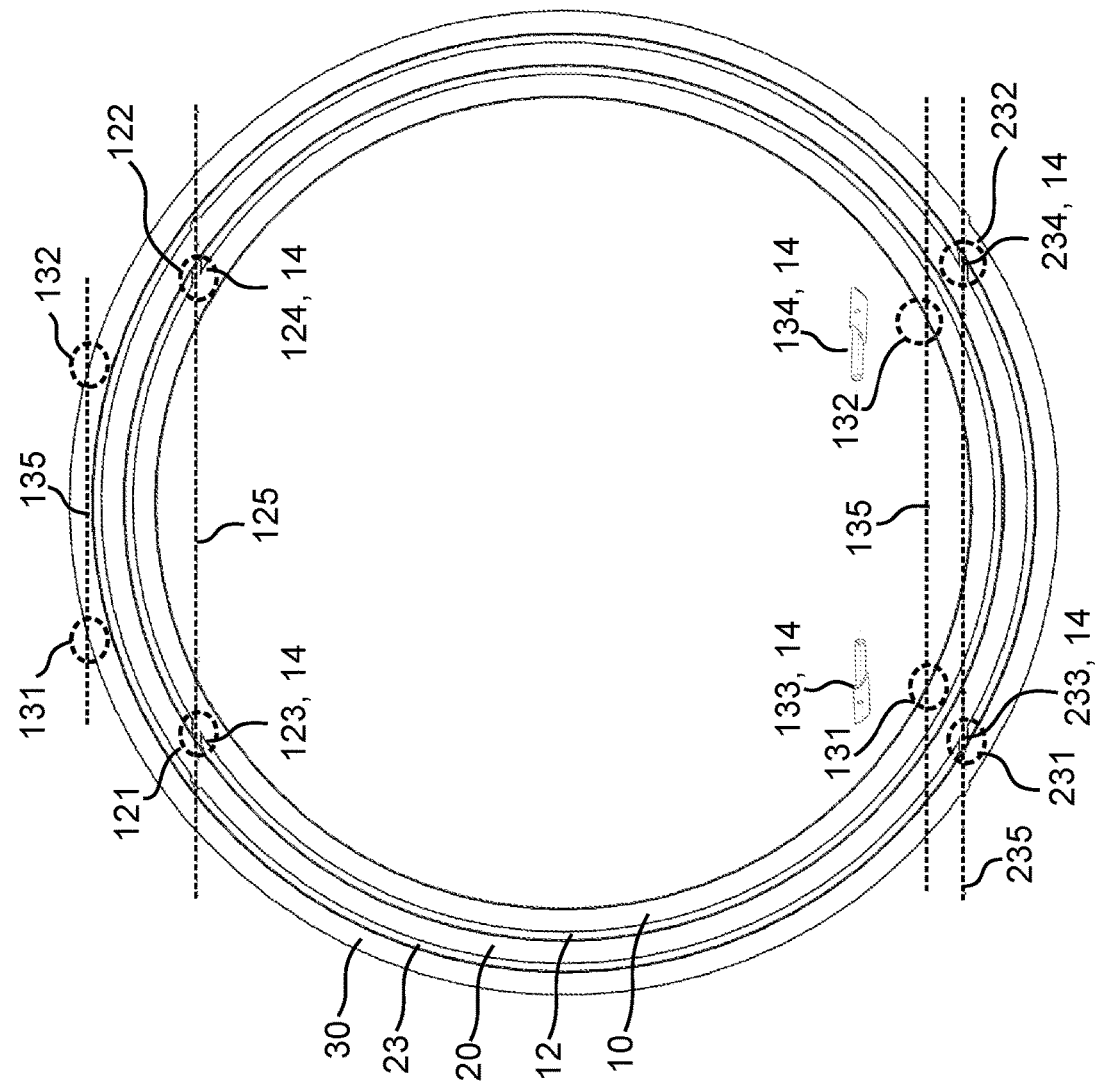
Figure 4A:
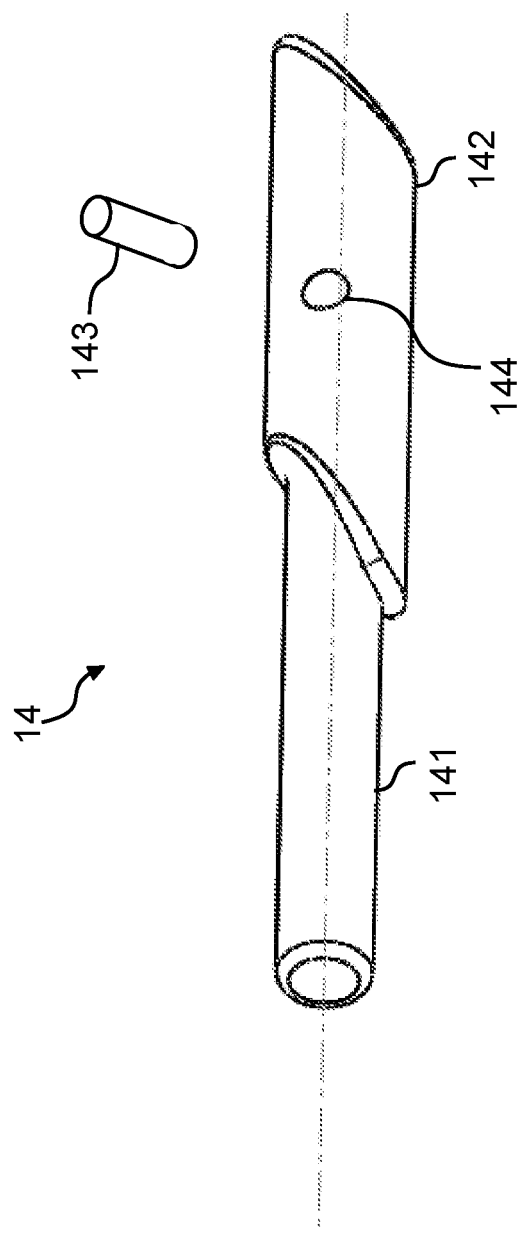
Figure 4B:
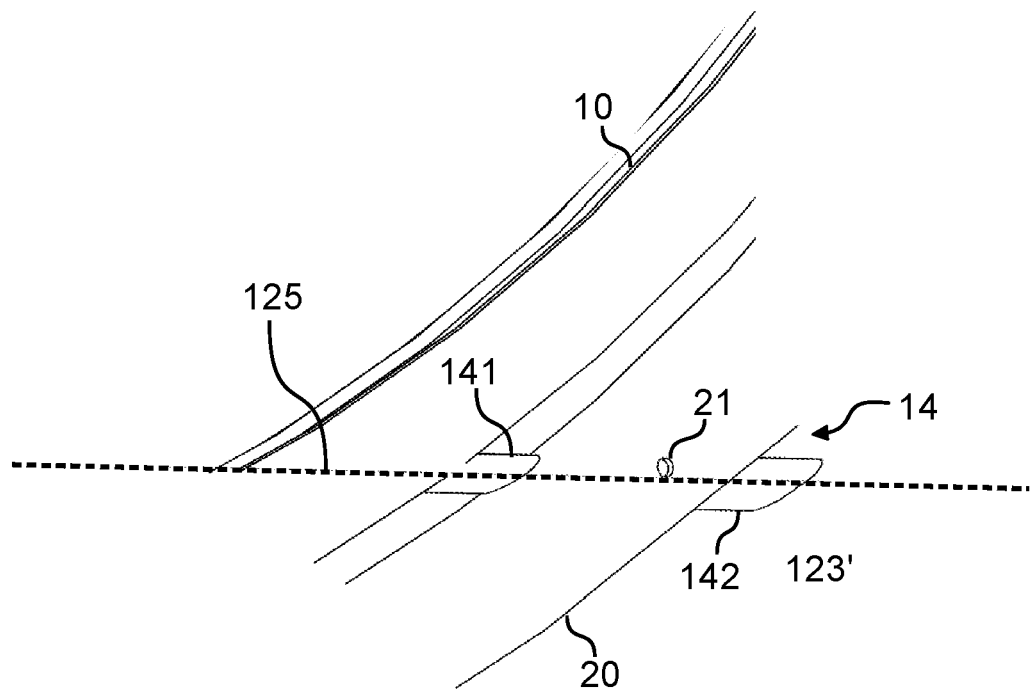
Figure 5:
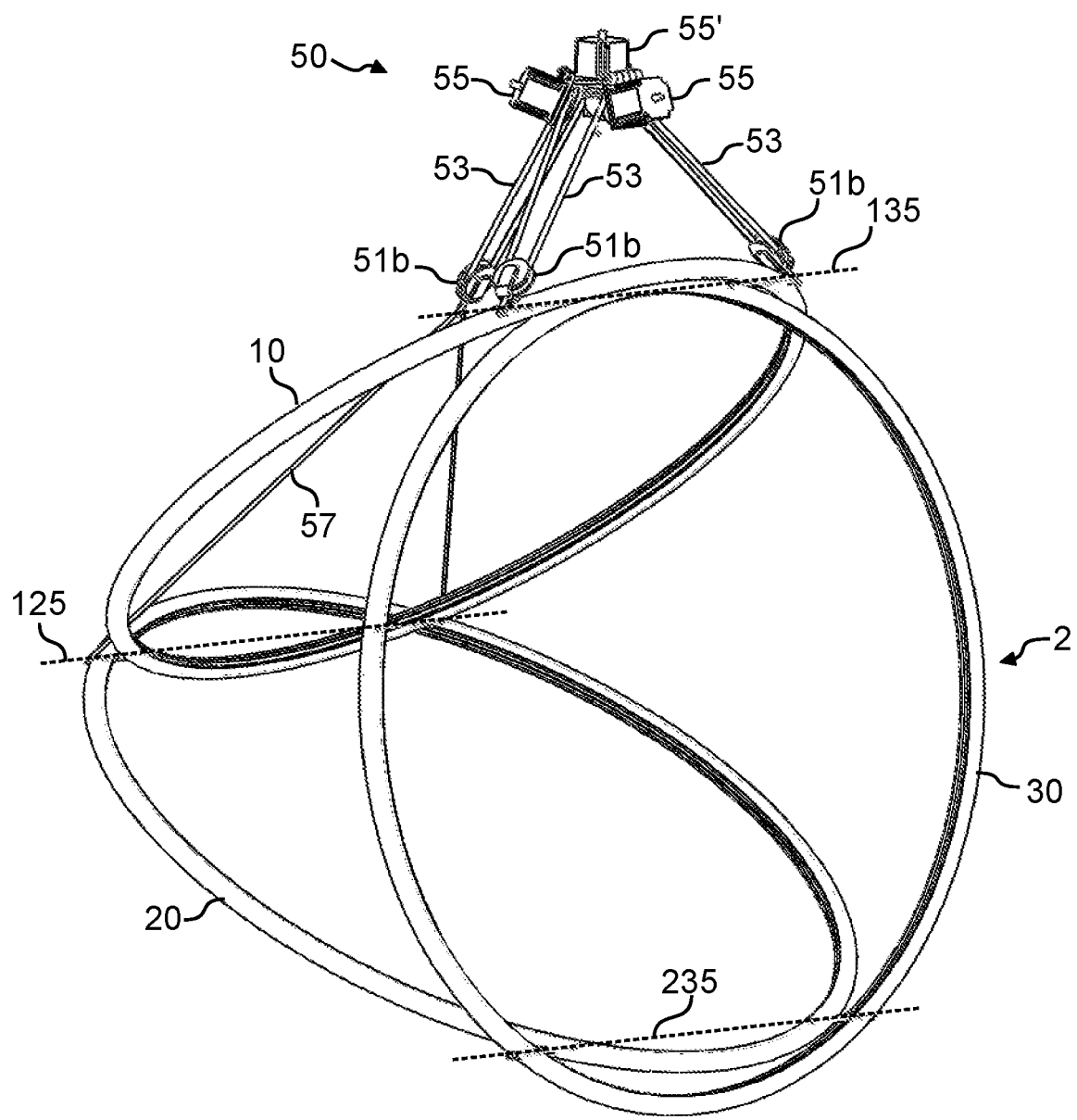
Figure 5A:
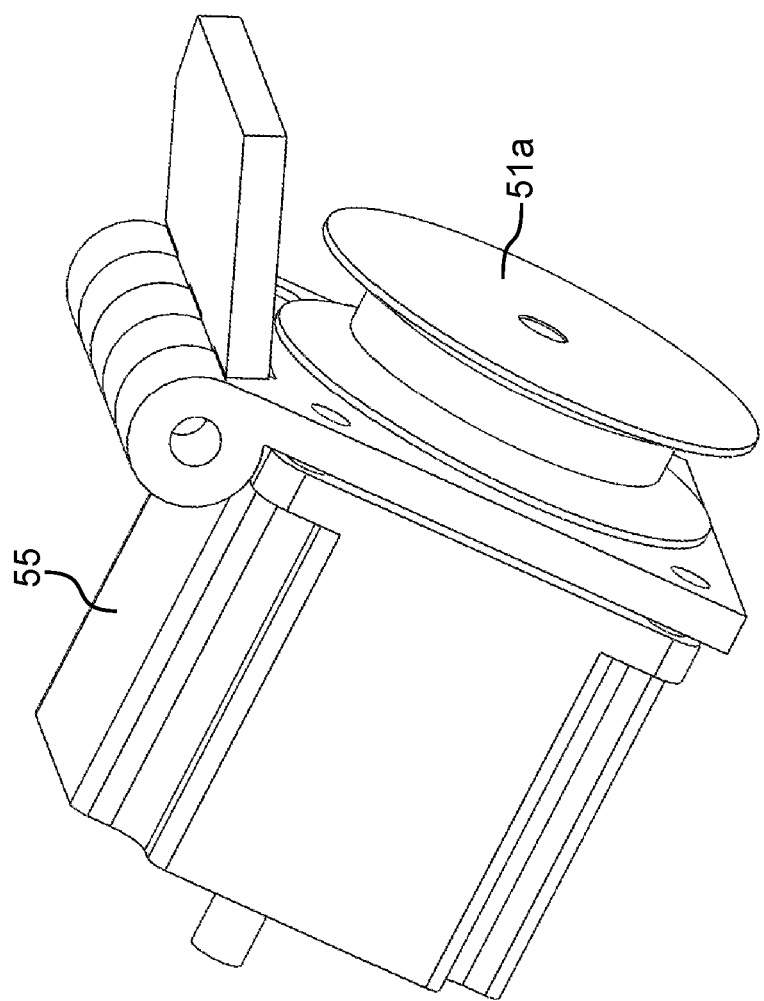
Figure 6:
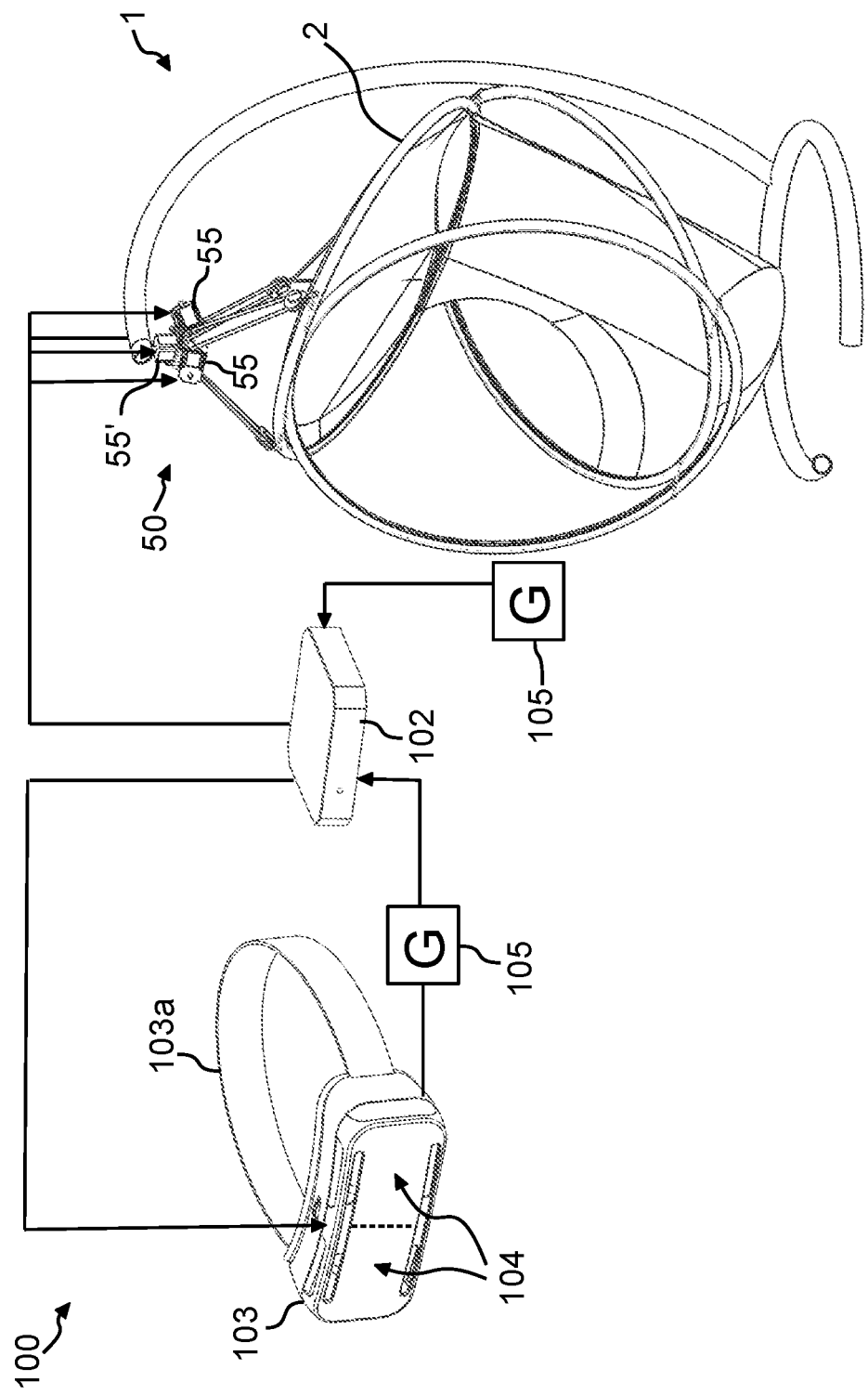
Figure 7:
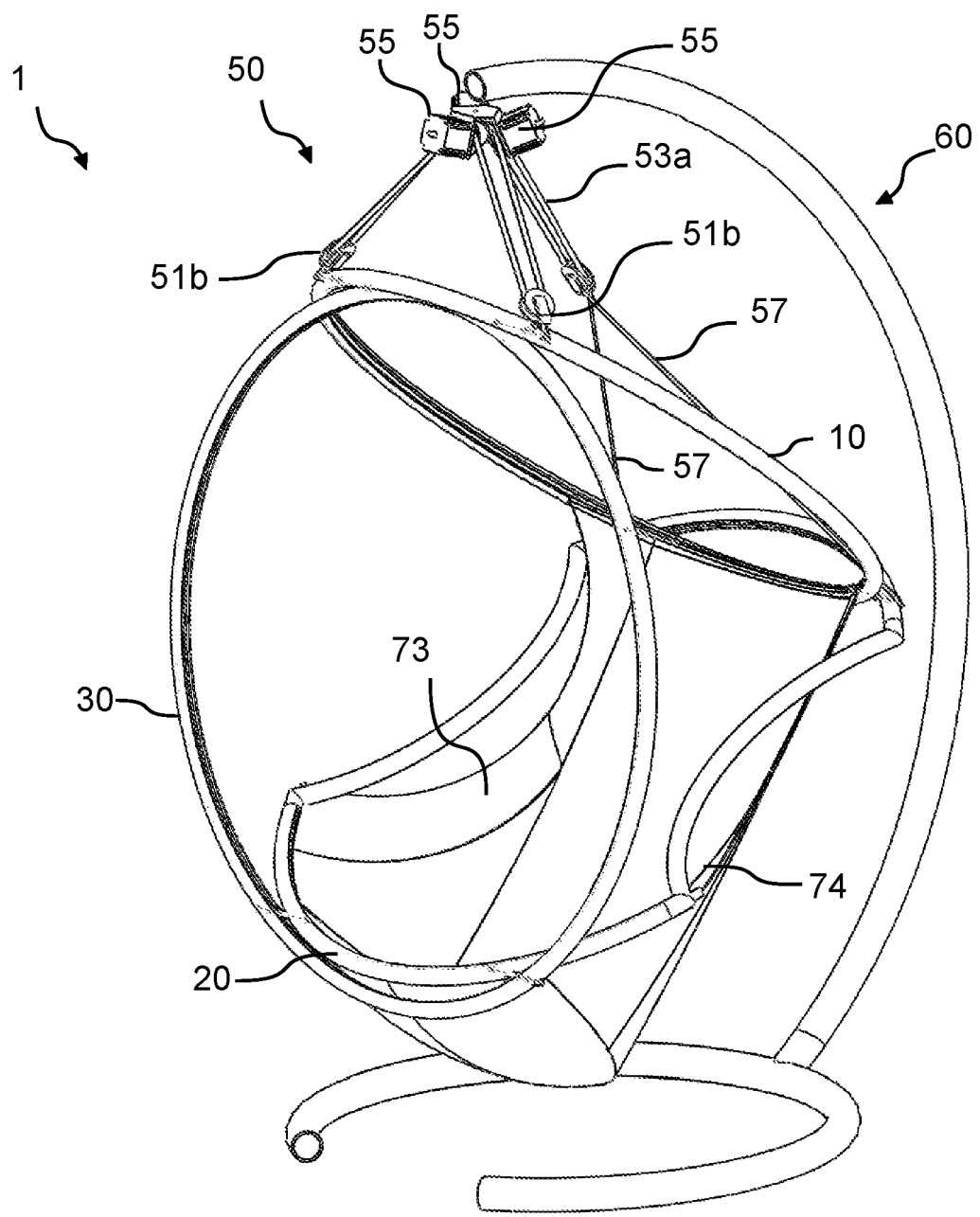
Figure 8:
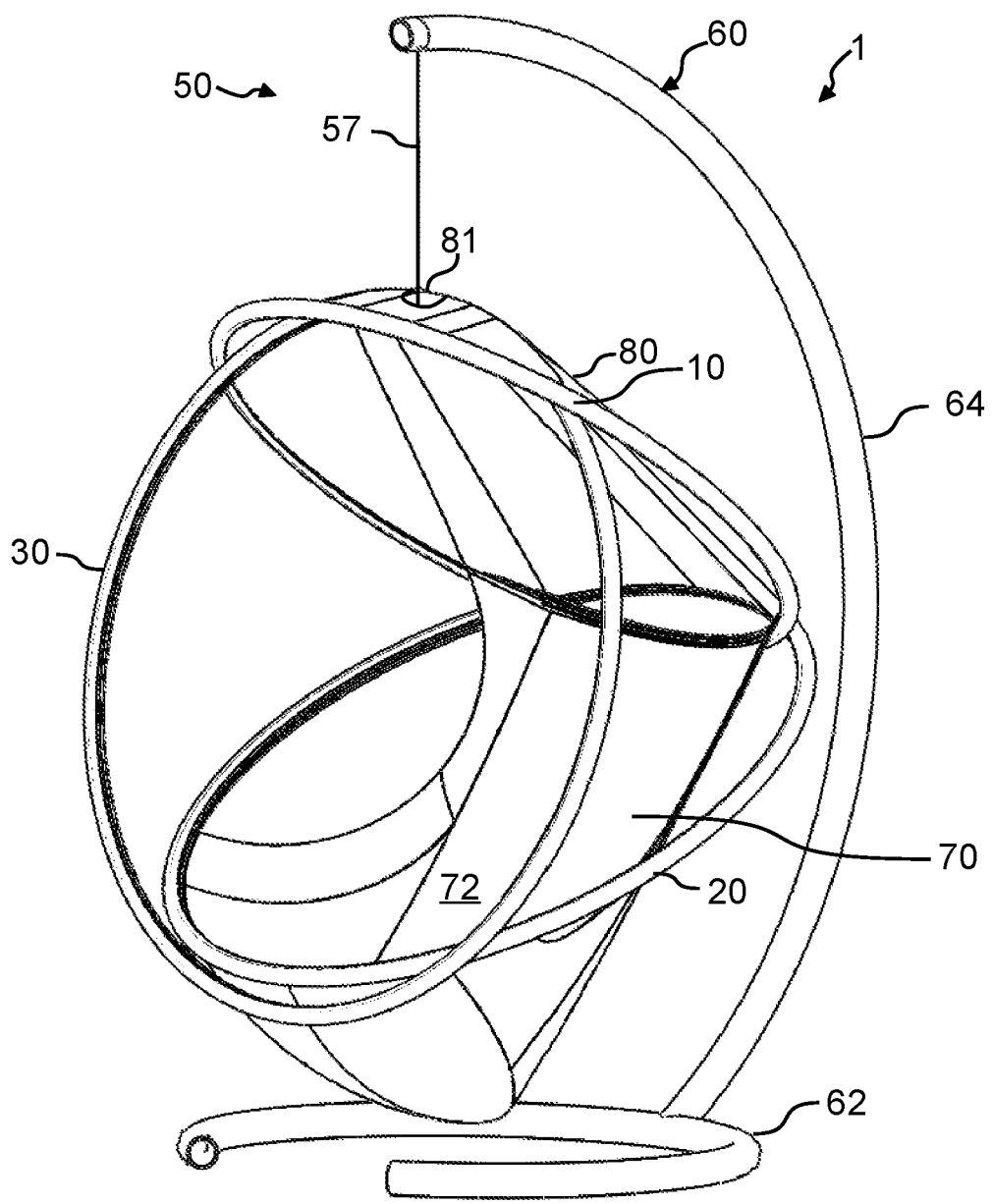
Figure 9:
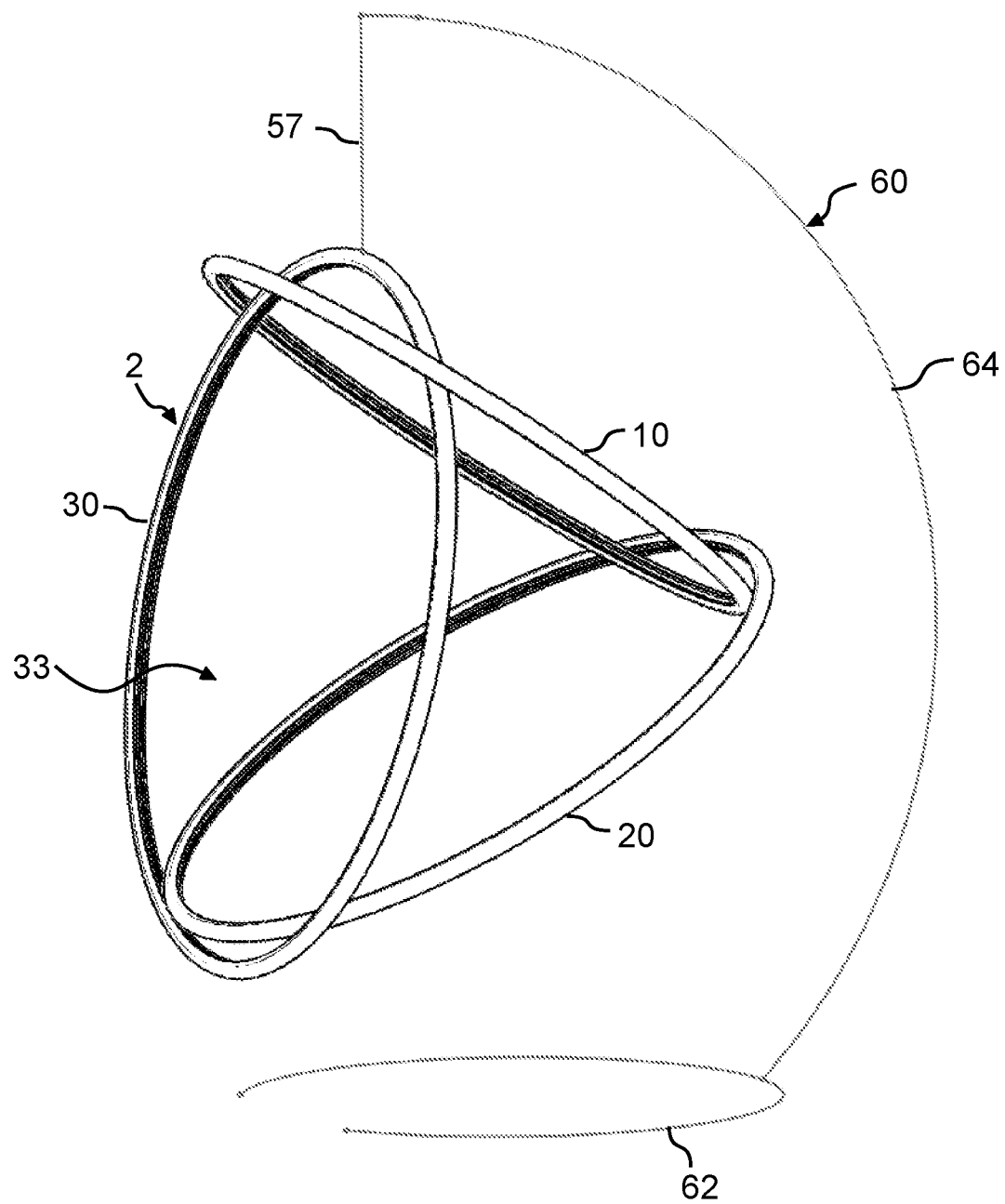
Figure 10:
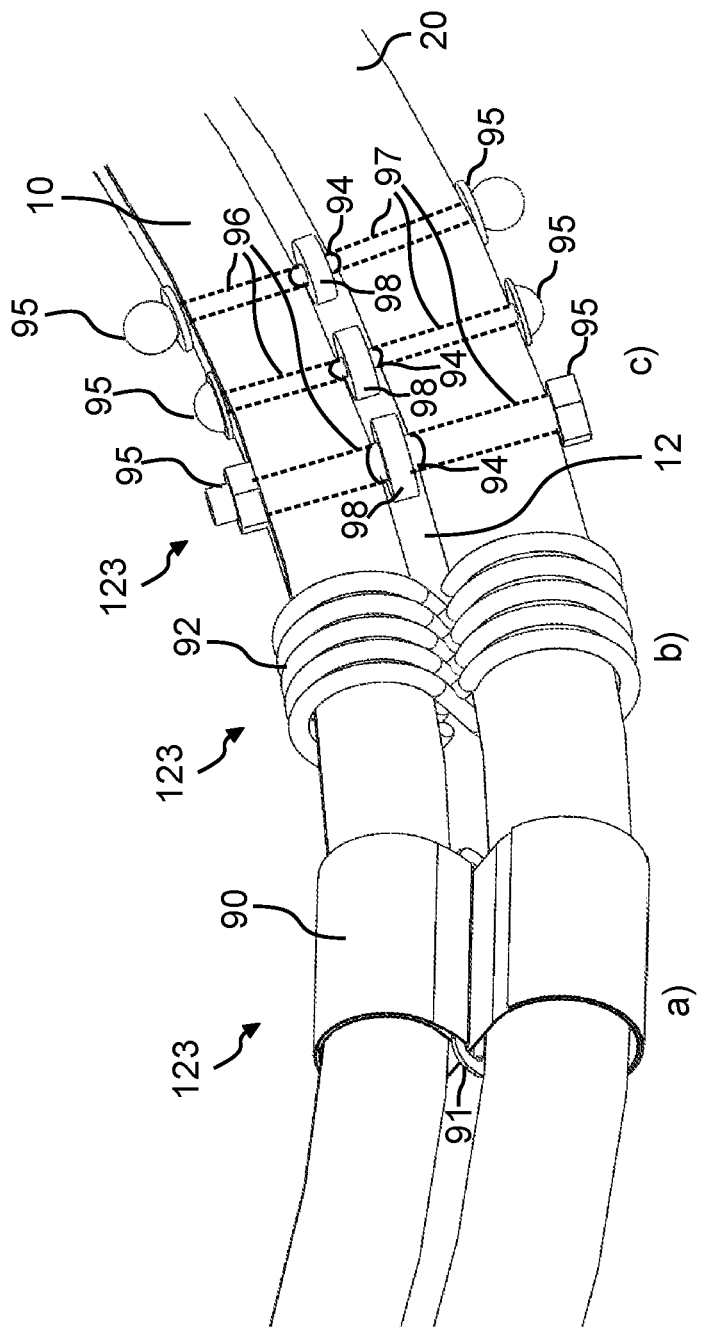
Figure 11:
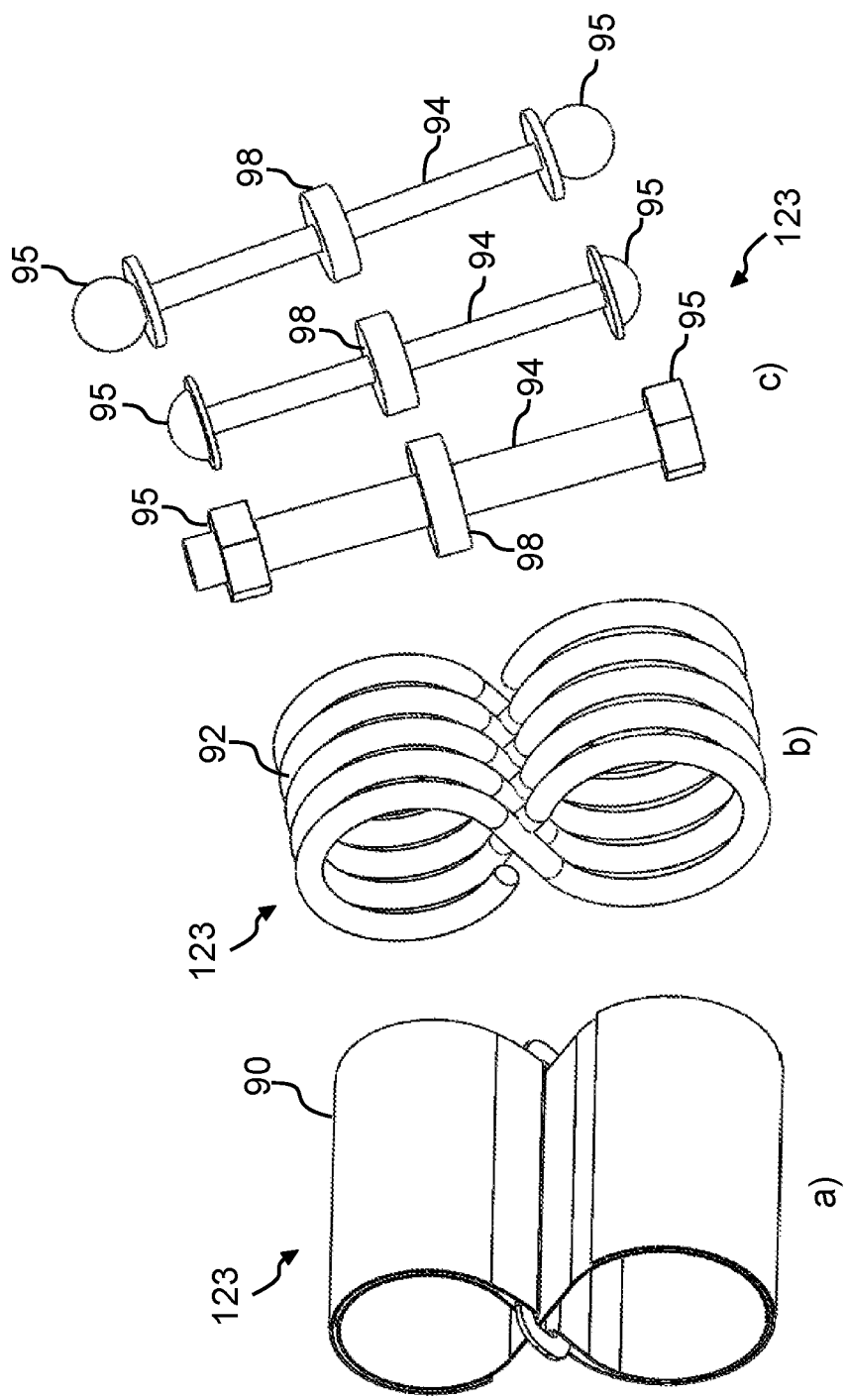

Further details of the invention will be explained by way of exemplary embodiments with reference to the following figures:

FIG. 1 is a schematic perspective view of a first embodiment of the hanging chair according to the invention, FIG. 1*a* is a schematic perspective view showing the securing of the seat of the hanging chair according to FIG. 1, FIG. 1*b* is a schematic perspective view showing an alternative securing method for the seat of the hanging chair according to the invention, FIG. 2 is a schematic side view of the hanging chair according to FIG. 1, FIG. 3 is a schematic front view of the hanging chair according to FIG. 1, FIG. 4 is a schematic perspective view showing the securing of the frame elements of the hanging chair according to FIG. 1 to each other, FIG. 4*a* is a schematic perspective view of an exemplary fastener, FIG. 4*b* is a schematic perspective view showing the connection of two frame elements with the fastener according to FIG. 4*a*, FIG. 5 is a schematic perspective view illustrating the suspension of the frame assembled from the frame elements of the hanging chair according to FIG. 1, FIG. 5*a* is a perspective view of a motorised pulley of the hanging chair according to FIG. 1, FIG. 6 is a block diagram of a virtual reality simulator comprising the hanging chair according to claim 1, FIG. 7 is a schematic perspective view of another exemplary hanging chair according to the invention, FIG. 8 is a schematic perspective view of a further embodiment of the hanging chair according to the invention, FIG. 9 is a schematic perspective view illustrating the suspension of the frame of the hanging chair according to FIG. 8, FIG. 10 is a schematic perspective view of several exemplary embodiments of the securing elements connecting the frame elements of the hanging chair according to the invention, and FIG. 11 is a perspective view of the securing elements illustrated in FIG. 10 without the connected frame elements.

FIG. 1 shows a preferred embodiment of a collapsible hanging chair 1 according to the invention in assembled, suspended state. The same hanging chair 1 may also be observed in FIGS. 2 and 3 in side and front view. The hanging chair 1 has a frame 2, which contains three releasably assembled ring-shaped first, second and third frame elements 10, 20 and 30. The planes of the frame elements 10, 20, 30 are at angles to each other, as it may be observed in FIGS. 1 and 2, in such a way that the planes delimit an imaginary prism with a triangular cross-section. The frame 2 is suspended with suspension 50, on a support column 60 in the present embodiment.

The support column 60 has a base 62 and a curved rod 64, and the suspension 50 is secured to the upper portion of the curved rod 64, as it can be seen in FIGS. 1 to 3. In the present case the curved rod 64 is curved along a circular curve, but, naturally, a rod 64 curved along a different curve or even bent at an angle may be used as part of the support column 60. The support column 60 may also contain further support elements, for example, in the case of a rod 64 bent at a 90-degree angle, which has a vertical and horizontal portion, it is preferable to use a brace piece that diagonally connects the two portions, as is well known to a person skilled in the art. The curved rod 64 is preferably hollow, in this way electric cables and/or data cables may run through its interior, which may exit the interior at the upper portion of the rod 64 and may even lead to the suspension 50, and through that into the frame 2. The electric cables may be used for powering devices (e.g. lighting, laptop/telephone charger, etc.), and wired data communication may be provided with the data cables.

In the case of an embodiment that does not have a support column 60 the suspension 50 may also be secured to another object located in the area of use, such as to a hook secured to the ceiling.

The suspension 50 is located outside of the frame 2, above the first frame element 10, whereby the first frame element 10 determines the top of the hanging chair 1.

A first canvas 70 is fixed to the frame, which is located outside of the frame 2 extending outwardly from the second frame element 20 when the hanging chair 1 is in suspended position, and its central part forms a seat 72, therefore the second frame element 20 delimits the seat 72 protruding through it from the frame 2, while the third frame element 30 delimits a seat opening 33 allowing sitting on the seat 72. The seat 72 includes a seat surface under the user's posterior, as well as a back support surface supporting the user's back, which together support the user in seated position.

In the case of the present embodiment the first canvas 70 forming the seat 72 is secured to the frame 2 such that the lower edge of the first canvas 70 is secured to the second frame element 20, while its upper edge is secured to the first frame element 10, as it can be better observed in FIG. 1*a*. Other embodiments are also conceivable in the case of which the canvas 70 is, for example, only secured to the second frame element 20 (see FIG. 1*b*), or to the first and third frame elements 10, 30, or to all three frame elements 10, 20, 30. However, the securing method according to FIG. 1*a* ensures a particularly ergonomic arrangement, as securing the upper edge to the first frame element 10 provides a cylindrically curved back support shape to the upper part of the canvas 70, while securing the lower edge to the second frame element 20 forms a cylindrically curved seat from the lower part of the canvas 70.

Two side portions of the first canvas 70 are provided as armrests 73, 74, also in the interest of better ergonomics. Naturally, armrests may also be provided separately from the canvas 70, as is obvious for a person skilled in the art. An opening is preferably left above the armrest for the user to reach out so that the user may easily place objects onto the floor, for example, while seated in the hanging chair 1.

A pocket 75 is provided on the rear of the seat 72 of the first canvas 70, as can be seen in FIG. 2. In addition to or instead of the pocket 75 numerous other storage facilities may be provided, for example further storage places may be formed on the rear surface of the canvas 70, or additional storage sacks may be fitted to the rod portion between the upper securing elements, or onto a second canvas 80 forming the top element. Further storage accessories (such as cup holder, etc.) may also be fixed to the rods of the frame elements 10, 20, 30, or integrated, e.g. sewn, into the seat.

Preferably, a shading second canvas 80 is secured to the frame 2 in such a way that it substantially covers the opening delimited by the first frame element 10. In the case of the present embodiment most of the second canvas 80 is secured to the first frame element 10, but the edge of the canvas 80 close to the second frame element 20 is secured to the second frame element 20, in this way it does not prevent the securing of the first canvas 70 to this portion of the first frame element 10. Naturally an embodiment is conceivable wherein the first and/or second canvas 70, 80 is/are also secured to the third frame element 30, or may be secured to it upon assembly.

The securing of the canvasses 70, 80 may take place in any known way, for example, the edges of the canvases 70, 80 are folded over the frame elements 10, 20 and sewn together so as to encompass the given frame element 10, 20. Another possibility is that frame elements 10, 20 are used that may be split open, and hooks are provided at the edges of the canvases 70, 80, through which the split open frame element 10, 20 may be threaded. Another possibility is that the openable frame element is provided with a slot profile, and the edges of the canvases 70, 80 to be secured are provided with sewn piping that fits into the slot profile. Naturally other securing methods are conceivable that are obvious to a person skilled in the art.

In FIG. 4 the frame elements 10, 20, 30 are shown in collapsed state with the first canvas 70 and the second canvas 80 being removed in the interest of better illustration. In the present case the three frame elements 10, 20, 30 are provided as concentric circular rings that have increasing diameters, in this way when collapsed they fit into one another: with the smallest diameter first frame element 10 located on the inside and with the largest diameter third frame element 30 located on the outside. This dimensioning is particularly preferred because in this way the seat opening 33 delimited by the largest frame element 30 is as large as possible, thereby making the use of the hanging chair 1 more comfortable. Another advantage is that as a result of the large diameter of the third frame element 30, the first frame element 10 located in the upper range of the third frame element 30 is raised more from the seat 72, which increases the user's sense of space. In case the hanging chair 1 is made for adults the diameter of the frame elements 10, 20, 30 is preferably between 100 and 130 cm, for example, the diameter of the smallest first frame element 10 is 110 cm, the diameter of the intermediate second frame element 20 is 113.5 cm and the diameter of the largest third frame element 30 is 117 cm, and the thickness of the frame elements 10, 20, 30 is 3 cm, in this way there are 5 mm gaps 12, 23 between the frame elements 10, 20, 30 when collapsed into one another. Naturally other frame element thicknesses and gap sizes are conceivable. The gap 12, 23 facilitates the pivoting of the frame elements 10, 20, 30 with respect to each other, and in the case of certain fixtures to be presented at a later point, the space requirement of the fixture may make it necessary to make use of the gaps 12, 23.

Naturally, the ring-shaped frame elements 10, 20, 30 may be provided as concentric pieces and/or as pieces fitting into one another of other shapes than circular. A ring-shaped piece is understood to mean a piece that delimits an aperture of any desired shape, in other words, the ring-shaped frame elements 10, 20, 30 may also be, for example, rectangular. The second frame element 20 of the embodiment shown in FIG. 7 is also referred to as a ring-shaped piece, although the side parts follow the curve of the armrests 73, 74. If the ring-shaped frame elements 10, 20, 30 cannot be fitted into one another, then preferably fasteners are provided that make it possible to fold the frame elements 10, 20, 30 onto one another.

The first frame element 10 and the second frame element 20 are secured to each other in first two securing zones 121 and 122, shown by a dotted circle each, by a first pair of fasteners 123, 124 in such a way that the frame elements 10 and 20 may be pivoted with respect to each other around a first axis 125 passing through the first two securing zones 121 and 122. In the case of this embodiment the fasteners 123, 124 are each a pin 14 that diagonally penetrates into the ring-shaped body of the frame elements 10 and 20. Preferably both frame elements 10, 20 are formed as hollow rings that have bores drilled in them at the position of the pins 14. An exemplary pin 14 has been shown separately in FIG. 4a, and FIG. 4b illustrates the securing of the frame elements 10 and 20 to each other with the pin 14. The pin 14 has a first cylindrical portion 141 of a smaller diameter and a second cylindrical portion 142 of larger diameter, in which a bore 144 is formed for accommodating a fixing bolt 143. For the purpose of fixing, the bolt 143 may be formed with a thread, a ball or any other bolt-fixing solution can be applied. FIG. 4b shows the position of the pin 14 in the bores formed in the frame elements 10 and 20. In addition to this the wall of the frame element 20 is provided with an opening 21 permitting the insertion of the fixing bolt 143 into the bore 144. The pin 14 may be inserted through the second frame element 20, and on the other side inserted into the first frame element 10, then by inserting the bolt 143 through the opening 21 and into the bore 144 the pin 14 is secured against falling out. Another pin 14 forming the fastener 124 and having a similar structure is used on the other side to prevent the frame element 10 from slipping off the pin 14 forming the fastener 123. By removing the bolt 143 the pin 14 can also be removed thereby ensuring a releasable connection between the two frame elements 10, 20. However, in the case of the present embodiment, the pivoting of the frame elements 10, 20 with respect to each other may also be ensured with non-releasable fasteners 123, 124 between the first and second frame elements 10, 20, in other words permanently fixed pins 14 could also be used.

The second frame element 20 and the third frame element 30 are secured to each other with a second pair of fasteners 233, 234 in second two securing zones 231, 232 on the side of the second frame element 20 opposite the first axis 125 so that they may pivot around a second axis 235 passing through the second two securing zones 231, 232. The pivoting connection is provided by removable pins 14 in the present case also.

The first frame element 10 and the third frame element 30 may be secured to each other with similar fasteners 133, 134 formed as pins 14, for example, in such a way that with the second frame element 20 being placed on the ground, the first frame element 10 being pivoted around the axis 125 and the third frame element 30 being pivoted around the axis 235, the securing zones 131, 132 each marked in FIG. 4 at the first frame element 10 and at the third frame element 30 with dotted circles and the two axes 135 become overlapped, and the pins 14 may be inserted into the appropriate bores of the first frame element 10 and the third frame element 30 in the way shown in FIG. 4b.

The first frame element 10 and the third frame element 30 may also be pivoted with respect to each other around the axis 135, provided that one of the other pairs of fasteners 123, 124 or 233, 234 are removed in advance.

It is not necessary for all three pairs of fasteners 123, 124 and 233, 234 and 133, 134 to be releasable, it is sufficient if one pair is releasable. Such embodiments are also conceivable wherein the pair of releasable fasteners 133, 134 is not between the first frame element 10 and the third frame element 30, instead, for example, between the second frame element 20 embracing the seat 72 and the third frame element 30 delimiting the seat opening 33. In this case preferably the second frame element 20 forms the smallest ring, and the first frame element 10 forms the intermediate ring.

The suspension 50 of the frame 2 containing the assembled frame elements 10, 20, 30 is shown in FIG. 5 with the first and second canvases 70, 80 removed. In the case of the present embodiment the suspension 50 contains three upper pulleys 51a arranged at an angle to each other, three lower pulleys 51b and a carrying cord 53 passing through the pulleys 51a, 51b.

In the case of a particularly preferred embodiment the suspension 50 is motor-driven, i.e. a motor 55, 56 is in driving connection with each of the upper pulleys 51a, as presented enlarged in FIG. 5a in the case of one of the pulley 51a. Preferably the pulleys 51a are fixed to the driven axle of the motors 55, whereby if the axles are driven the pulleys 51a rotate with them. The pulleys 51a and the carrying cord 53 are arranged such that the rotation of the pulleys 51a results in the displacement of the carrying cord 53 along the pulleys 51a. This may be carried out in several ways. For example, the pulleys 51a may be formed as friction wheels, and a rope or ribbon that does not stretch and that adheres to the friction wheels may be used as the carrying cord 53. Another possibility, for example, is the use of a cogwheel as a pulley 51a, and forming the carrying cord 53 as a ribbed belt. Yet another possibility, for example, is the use of a chain as the carrying cord 53 and a chain drive wheel as the pulley 51a. A solution is also conceivable in the case of which the carrying cord 53 is wound around the individual pulleys 51a several times, by which the displacement of the carrying cords 53 may also be achieved.

In the case of the embodiment shown in FIG. 5 the carrying cords 53 are provided as drive belts, and are threaded through the upper pulleys 51a and the lower pulleys 51b.

The three lower pulleys 51b are fixed to the frame 2, preferably at four fixing points, which preferably are located in the vicinity of the four securing zones 121, 122, 131, 132, for example the lower pulleys 51b may be secured to the free ends of the four pins 14 inserted through the frame element 10. In the present case, one of the lower pulleys 51b, preferably the pulley 51b on the side opposite the seat opening 33 is fixed to the frame 2 at two securing points, at the free ends of the pins 14 forming the fasteners 123, 124. The lower pulleys 51b are preferably secured to the frame 2 with suspending cords 57 (e.g. string, rope, chain, etc.).

In the case of this embodiment the suspension 50 also contains a motor 55' fixed to the three top motorised pulleys 51a suitably adapted for rotating the hanging chair 1 around the vertical axis, as it can be seen in FIG. 5.

It can also be seen in FIG. 5 that with the frame elements 10, 20, 30 in their state of being fixed to each other and suspended, the suspension 50 is located outside of the frame 2, above the first frame element 10, which is understood to mean a position that falls in an upper space part of the two space parts delimited by the plane of the first frame element 10.

The frame 2 is preferably suspended so that the base of the seat opening 33 is preferably located approximately 25 to 45 cm from the ground, so that the user's feet comfortably reach the ground, and the user can easily move the hanging chair 1 with his/her feet, which is particularly good for the knee joints due to the lack of load on them. Naturally hanging chairs dimensioned for child users are preferably suspended at a lower height.

The motorised suspension 50 is particularly preferred in case the hanging chair 1 is a part of a virtual reality simulator 100, the more important parts of which are illustrated in the block diagram shown in FIG. 6. The virtual reality simulator 100 contains an IT (information technology) control device 102 adapted for displaying virtual reality as well as virtual reality glasses 103 being in data connection with the IT control device 102. The virtual reality glasses 103 being adapted for displaying 3-dimensional images and are preferably secured to the user's head with a strap 103a and contain a screen 104 integrated into the glasses 103.

The IT control device 102 may be, for example, a desktop computer, laptop, tablet, smartphone, remote server, etc., and the pocket 75 provided on the rear side of the first canvas 70 may serve to store this during use.

Any known stereoscopic technology may be used in the screen 104 of the virtual reality glasses 103. The screen 104 may be formed, for example, as a divided screen (even consisting of two separate screens), on one part of which an image recorded from the perspective of the right eye is projected and on the other part of which an image recorded from the perspective of the left eye is projected simultaneously. The screen 104 may be part of a smartphone, which is placed in virtual reality glasses formed as a special case that can be worn on the head, which physically separates the right and left sides of the screen 104 from the direction of the user's other eye, as is well known to a person skilled in the art. The smartphone may also function as the control device 102, in this case the control device 102 indicated as a separate element in FIG. 6 may be left out.

The data connection may be provided via a wired and/or wireless (e.g. WiFi, Bluetooth, Zigby) connection. In the case of a purely wired connection the wires preferably run through the hollow interior of the curved rod 64, and are led to the suspension through the upper portion of the rod 64.

Preferably the motors 55 being in driving connection with each of the upper pulleys 51a of the suspension 50 may be controlled by the IT control device 102, in other words the movement of the frame 2 may be controlled by the control device 102. In the virtual reality simulator 100 this may be used to ensure that the user seated in the hanging chair 1 moves in accordance with the 3-dimensional image (typically moving image) displayed on the screen 104 (such movement may be e.g. tilting to the right/left/forwards/backwards). Preferably not only the switching on and switching off of the motors 55 can be controlled by a signal from the control device 102, their speed of rotation can also be controlled, in this way not only the direction of the spatial movement of the frame 2 but also the speed of this movement can be controlled. Controlling the movement of the frame 2 in accordance with the projected 3-dimensional moving image contributes substantially to the virtual reality experience of the user. The possible movement of the frame 2 also includes rotation around the vertical axis, which in the present embodiment is provided by the vertical axis motor 55'. However, an embodiment is conceivable in the case of which rotation around the vertical axis may be performed by the user manually, which, on the one hand, has a positive effect on the knee joint, as mentioned above, and, on the other hand, increases the user's feeling of safety, if there is a fixed reference plane on which the user's feet may rest.

Without motorised suspension 50 the user may use his/her feet to follow what is seen in the 3-dimensional moving image, and vice versa. For this, the hanging chair 1 has to be located at a height so that the feet of the user seated in the seat 72 reach the ground, in this way the user may control the movement of the frame with respect to the ground with his/her feet.

External control and the movement controlled by the user's feet may also be preferably combined. For example, a gyroscope 105 being in data connection with the control device 102 may be arranged on the screen 104, through which the control device 102 may be informed of the movement effected by the user (such as rotation of the frame 2 around the vertical axis), in response to which the control device 102 may displaying an image that corresponds to the movement. In the case of a particularly preferred embodiment the control device 102 is a smartphone, which contains the screen 104 and the gyroscope 105, and may be secured to the user's head with a known support element to form virtual reality glasses 103. The smartphone may display the part of a 3-dimensional recording that corresponds to the direction and magnitude of the detected movement, as is well known to a person skilled in the art.

Naturally, the movement of the frame 2 may be detected in other ways also, for example using a gyroscope 105 secured to another suspended element (for example, the canvas 70 or 80) secured to the frame 2 or connected to it, the signal from which is transmitted to the control device 102 via wired and/or wireless data connection.

FIGS. 8 and 9 show a second preferred embodiment of the hanging chair according to the invention. The same elements have been indicated with the same reference numbers. Only the differences will be explained in the following. In the case of this embodiment the suspension 50 contains a single suspending cord 57, which is secured to the upper part of the third frame element 30, as can be better seen in FIG. 9. The second canvas 80 contains a cut-out 81 so that the suspension 50 may pass through it. In FIG. 9 the securing of the suspending cord 57 to the third frame element 30 has been illustrated with the canvases 70 and 80 removed.

Various embodiments of the fasteners 123 between the first and second frame elements 10, 20 are shown in FIGS. 10 and 11, but naturally the fastener 123 presented are not necessarily used only between these two frame elements 10, 20. In the case of example a) the fastener 123 is formed as a strap running around the two frame elements 10, 20 in a shape forming the number "eight". In the case of example b) fixing knots or eye splices are created from rope 92. In the case of example c) the fastener 123 is realised with flexible wire rope 94 formed in three different ways, at each of the two ends of which there is an end piece 95 with a larger cross-section, which can be removed at least at one end, in this way the wire rope 94 can be inserted through the bores 96, 97 which are formed in the frame elements 10, 20 and which are indicated by dotted lines. Preferably, there is a removable end piece 95 at both ends of the wire rope 94, and in case the frame elements 10, 20 are secured together a spacer 98 is placed between the two frame elements 10, 20, so that the gap 12 is formed between the frame elements 10, 20. Any other flexible, non-stretching, high-strength wire may be used instead of the wire rope 94.

In the case of the presented examples, the fastener 123 provides a releasable connection between the frame elements 10, 20 that permits the frame elements 10, 20 to pivot with respect to each other. Naturally, the fasteners 123 shown here may be used between two other frame elements 20, 30 or 10, 30 as well, furthermore, numerous other releasable and non-releasable securing methods may be applied which are obvious for a person skilled in the art and which permit the frame elements 10, 20, 30 to pivot with respect to each other.

Various modifications to the above disclosed embodiments will be apparent to a person skilled in the art without departing from the scope of protection determined by the attached claims.

The invention claimed is:

1. A collapsible hanging chair containing a frame (2), a suspension (50) securable to the frame (2) and a first canvas (70) supported by the frame (2), the first canvas (70) defining a seat (72), wherein the frame (2) contains three ring-shaped frame elements (10, 20, 30), of which
a first and second frame elements (10, 20) are secured to each other along a first axis (125) with a first pair of fasteners (123, 124),
the second and a third frame elements (20, 30) are secured to each other along a second axis (235) on a side of the second frame element (20) opposite the first axis (125) with a second pair of fasteners (233, 234), and
the first and third frame elements (10, 30) are secured to each other along a third axis (135) on a side of the first frame element (10) opposite the first axis (125) with a third pair of fasteners (133, 134),
wherein in an assembled and suspended state of the frame elements (10, 20, 30) the suspension (50) is located outside of the frame (2), above the first frame element (10), and the second pair of fasteners (233, 234) securing the second and third frame elements (20, 30) to each other are located below the first frame element (10), the seat (72) of the first canvas (70) is located outside of the frame (2), extending outwardly from the second frame element (20), and the third frame element (30) delimits a seat opening (33) permitting access to the seat (72).

2. The hanging chair according to claim 1, wherein at least one pair of fasteners (123, 124, 133, 134, 233, 234) releasably connects together two neighbouring-shaped frame elements (10, 20, 30), the other two pairs of releasable or unreleasable fasteners (123, 124, 133, 134, 233, 234) form pivoting connections along the corresponding axes (125, 135, 235) between the two respective frame elements (10, 20, 30) such that when the at least one pair of releasable fasteners (123, 124, 133, 134, 233, 234) are in a released state the two neighbouring-shaped frame elements (10, 20, 30) releasably connected therewith can be folded onto the other frame elements (10, 20, 30) by means of the pivoting connections provided by the other two pairs of releasable or unreleasable fasteners (123, 124, 133, 134, 233, 234).

3. The hanging chair according to claim 2, wherein the frame elements (10, 20, 30) are rings of different diameters that may be folded into one another when the at least one pair of releasable fasteners (123, 124, 133, 134, 233, 234) are in the released state.

4. The hanging chair according to claim 1, wherein a lower edge of the first canvas (70) is secured to the second frame element (20), and an upper edge of the first canvas (70) is secured to the first frame element (10).

5. The hanging chair according to claim 1, wherein two side portions of the first canvas (70) contain an armrest (73, 74).

6. The hanging chair according to claim 1, wherein a pocket (75) is formed on the side of the seat (72) of the first canvas (70) opposite a surface provided for sitting thereon.

7. The hanging chair according to claim 1, wherein a shading second canvas (80) is secured to the first frame element (10).

8. The hanging chair according to claim 1, wherein the suspension (50) is secured to the upper portion of the third frame element (30).

9. The hanging chair according to claim 8, wherein a shading second canvas (80) is secured to the first frame element (10), and a cut-out (81) is defined by the second canvas (80) allowing the suspension (50) to pass therethrough through it.

10. The hanging chair according to claim 1, wherein the suspension (50) contains three upper pulleys (51a), three lower pulleys (51b) and a carrying cord (53) passing through the pulleys (51a, 51b), and the three lower pulleys (51b) are secured to the frame (2).

11. The hanging chair according to claim 1, wherein a support column (60), having base (62) and a curved rod (64) attached to the base, and the suspension (50) is secured to an upper portion of the curved rod (64).

12. The hanging chair according to claim 11, wherein the curved rod (64) is hollow, and electric cables are provided inside the curved rod (64) which run to the suspension (50) through the upper portion.

13. The hanging chair according to claim 12, wherein one or more of said frame elements (10, 20, 30) are hollow, and the electric cables run inside the hollow frame elements (10, 20, 30) to exit points.

14. A virtual reality simulator including a hanging chair according to claim 1, an IT (information technology) control device (102) adapted for controlling movement of the hanging chair and for displaying virtual reality, virtual reality glasses (103) for placing in front of a user's eyes, the virtual reality glasses (103) having a screen (104) adapted for displaying 3-dimensional images and being in data connection with the IT control device (102).

15. The virtual reality simulator according to claim 14, wherein the suspension (50) contains three upper pulleys (51a), three lower pulleys (51b) and a carrying cord (53) running through the pulleys (51a, 51b), the three lower pulleys (51b) are secured to the frame (2), and the suspension (50) has motors (55) in driving connection with one of the upper pulleys (51a), the motors (55) being controllable by the IT (information technology) control device (102).

16. The virtual reality simulator according to claim 15, wherein the suspension (50) includes a fourth motor (55') operably associated with upper pulleys (51a), the fourth motor (55') being controllable by the IT (information technology) control device (102) and being adapted for rotating the hanging chair (1) in the suspended state around a vertical axis.

* * * * *